April 23, 1929. O. P. DURING 1,710,151
SCRAPING IMPLEMENT
Filed Nov. 23, 1927

Witness:
William P. Kilroy

Inventor:
Otto P. During

Patented Apr. 23, 1929.

1,710,151

UNITED STATES PATENT OFFICE.

OTTO PAUL DURING, OF CHICAGO, ILLINOIS.

SCRAPING IMPLEMENT.

Application filed November 23, 1927. Serial No. 235,323.

This invention relates to new and useful improvements in scraping implements and more particularly to a device adapted for scraping walls and the like. One of the objects of the invention is the provision of a scraper of the above character embodying a receptacle to receive the material scraped loose, so as to prevent scattering of the material.

Another object of the invention is the provision of a device of the above character wherein the scraper blade is detachably mounted with respect to the receptacle, so that the blade may be used independent of the receptacle if desired.

With the above and other objects in view the invention consists of the novel features of construction, the combination and arrangement of parts hereinafter more fully set forth, pointed out in the claim and shown in the accompanying drawings, in which—

Figure 1:
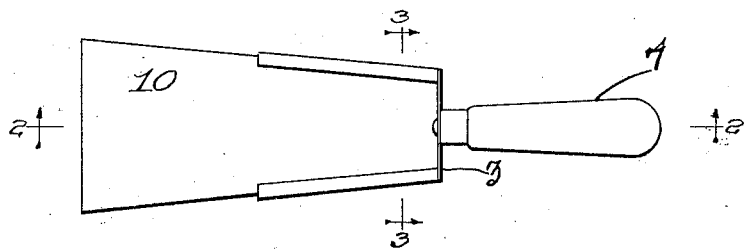
Figure 1 is a top plan view of my improved device.
Figure 2:
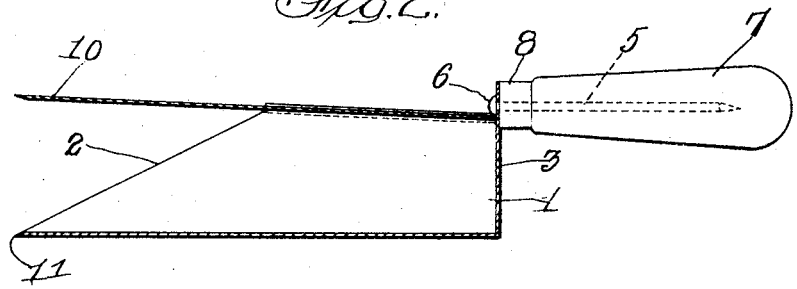
Figure 2 is a longitudinal section on the line 2—2 of Figure 1.

Referring more particularly to the accompanying drawings 1 indicates the body of the U-shaped receptacle, the side walls of which are cut on an incline at the open end thereof as shown at 2, while the rear end is closed by means of the partition wall 3. This rear end wall 3 has an upstanding perforated lug 4 and extending through this lug is the handle supporting rod 5, the inner end of which is headed as at 6 and bears against the inner face of the lug, as shown in Figures 1 and 2. The rod 5 extends into the handle member 7 a distance suitable to properly secure the handle to the receptacle.

Figure 3:
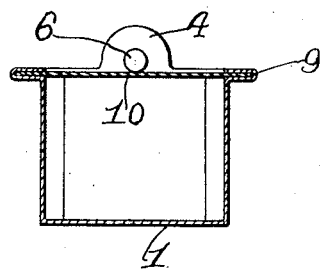
Figure 3 is a cross section on the line 3—3 of Figure 1.

Mounted upon the rod 5 and positioned between the inner end of the handle 7 and the lug 4 is a rubber ring 8 which serves as a buffer for the receptacle. The upper edge of the side walls of the receptacle are bent upon themselves to form longitudinal grooves 9, as shown in Figure 3, said grooves extending outwardly beyond the outer surface of the side walls.

The scraper blade which is indicated at 10 is tapering in form and the walls of the body are slightly divergent, as shown in Figure 2, so that the smaller end of the scraper may be readily inserted in the grooves 9. The outer edge of the blade 10 is sharpened so as to provide an efficient scraping surface and during the operation of the device the action or movement of the scraper will have a tendency to force the tapered end thereof tightly into the divergent grooves 9, the upper and lower faces of the blade frictionally engaging the apposed walls of the grooves so that the blade will be securely retained in place.

The outer and large end of the bottom portion of the receptacle 1 is formed with a sharpened edge 11, which can be used equally as well as the cutting edge of the scraper 9. It will be apparent that in the use of the device either the cutting edge on the blade may be used or the cutting edge of the receptacle and the loosened particles will be directed into the receptacle instead of dropping on the floor or other surface, and the receptacle may be quickly and easily emptied of its contents. The device is extremely simple in construction and is efficient for various uses.

While I have shown and described the preferred embodiment of my invention, it will be apparent that various changes and alterations may be carried out without departing from the spirit of the invention or the scope of the appended claims.

I claim as my invention:

In a device of the class described, a U-shaped receptacle having one end closed, a perforated lug on the closed end, a handle member secured to said lug, a buffer member between the handle and lug, and a removable scraper blade carried by the receptacle.

In witness whereof I have hereunto set my hand and seal, this 27th day of October, A. D. 1927.

OTTO PAUL DURING.